March 30, 1965 K. KNAUER 3,175,355
POWER PLANT HOUSING FOR SUPERSONIC AIRCRAFT
Filed Oct. 16, 1961

INVENTOR:
Karl Knauer
by Michael S. Strike
Attorney 3,175,355
POWER PLANT HOUSING FOR SUPERSONIC
AIRCRAFT
Karl Knauer, Munich, Germany, assignor to Ernst
Heinkel Flugzeugbau G.m.b.H., Speyer, Germany
Filed Oct. 16, 1961, Ser. No. 145,335
Claims priority, application Germany, Oct. 19, 1960,
H 40,715
11 Claims. (Cl. 60—35.6)

The present invention relates to a power plant housing for a supersonic aircraft, and more particularly to a nacelle housing a plurality of power units for propelling a supersonic craft.

In the supersonic range of velocities, it is not possible to compress the air entering the housing of the power plant without losses. In order to reduce the losses, and to maintain the pressure yield high, the entering air is reduced to sonic speed not by a strong perpendicular compression shock wave, but by one or several weak oblique compression shock waves followed by a perpendicular compression shock wave.

The shock waves are produced by a cone or wedge projecting from the inlet of the power plant. If the power plant housing is to contain several power units, it is necessary to prevent the power units from influencing each other.

Two types of housings or nacelles for twin power units are known. In accordance with one construction of the prior art, a conical surface of revolution forms the inlet, which has the disadvantage that the power units influence each other. In another construction of the prior art, a wedge inlet with separated air guiding surfaces is provided, which has the disadvantage that a high pressure yield over a substantial range of Mach numbers can be obtained only by adjustment of the angle of the wedge.

It is one object of the present invention to overcome the disadvantages of the prior art constructions of power plant housings or nacelles for a power plant including a plurality of power units, and to provide a power plant housing in which the power units do not influence each other.

Another object of the present invention is to provide a power plant housing for an aircraft which, without any adjustment, obtains a high pressure yield of the air entering the same.

Another object of the present invention is to provide a power plant housing in which the condition of the air entering the power plant remains substantially unchanged at different angles of attack.

Another object of the invention is to provide a power plant housing for a plurality of power plants in which a plurality of completely separated air streams pass through the power units.

Another object of the present invention is to provide a power plant housing having an air guiding surface of such a shape that the Mach number at which separation of air from the surface takes place is low.

Another object of the invention is to provide a power plant housing having an outer air guiding surface of such a shape that the boundary layer can be removed in a very simple manner.

With these objects in view, a separate air inlet is provided for each power unit in the power plant housing of the invention, and the inlets are uniformly distributed about the circumference of a forwardly located surface of revolution which produces the shock waves necessary for reducing the supersonic speed of the air to sonic speeds before the air is supplied to the power units.

According to one embodiment of the invention, a housing or nacelle has an outer surface terminating at the forward end of the nacelle in a forwardly tapering surface of revolution. The nacelle has air passages adapted to house power units and terminating at the forward end of the nacelle in a plurality of inlet ports located adjacent the surface of revolution. Consequently, the air forms a shock wave at the forward end of the nacelle by which the air speed is reduced so that separate streams of air enter through the inlet ports into the passages where the power units are located.

In accordance with the preferred embodiment of the invention, the nacelle has an outer surface including a forwardly tapering surface of revolution located at the forward end of the nacelle and having a pointed forward end and a circular base line, a main surface merging along the base line into circumferentially spaced portions of the surface of revolution, and front shoulder surfaces extending transversely to the axis of the surface of revolution axially spaced from the pointed end and from the base line of the same, and located intermediate the circumferentially spaced portions of the surface of revolution where the main surface merges into the same. The nacelle has inner air passages for separate power units, the air passages terminating in curved inlet ports located between the shoulders and the surface of revolution so that portions of the surface of revolution extend into the passages. Thus, separate streams of air reduced to sonic velocity by shock waves forming at the pointed end of the surface of revolution, and at the transverse shoulders of the nacelle, enter through the inlet ports for passing to the power units.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
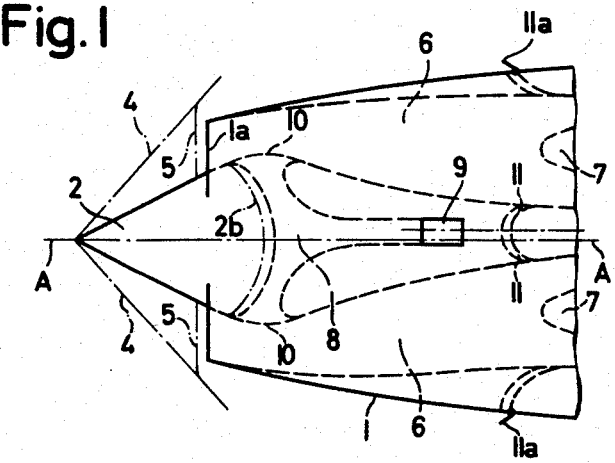
FIG. 1 is a fragmentary schematic side elevation of a nacelle or power plant housing according to one embodiment of the invention.
Figure 2:
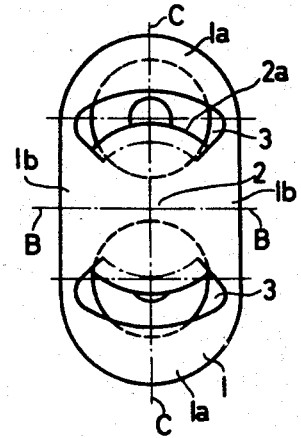
FIG. 2 is a front view of the nacelle shown in FIG. 1.
Figure 3:
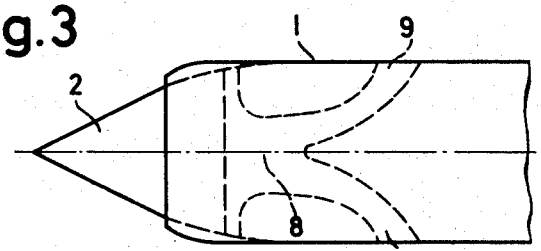
FIG. 3 is a plan view of the nacelle shown in FIG. 1.
Figure 4:
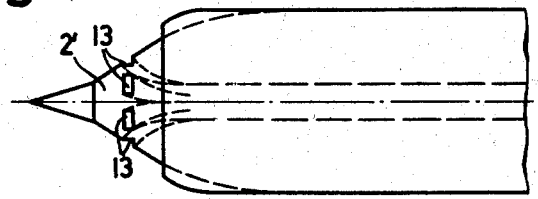
FIG. 4 is a plan view illustrating a modified embodiment.
Figure 5:
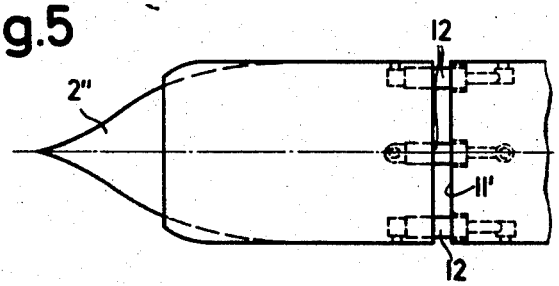
FIG. 5 is a plan view of another modified embodiment of the invention, of which the front of the inlet can be shifted for instance hydraulically against the back part.

Referring now to the drawings, and more particularly to FIGS. 1 to 3, a nacelle 1 has at its forward end a conical supersonic diffuser 2. The nacelle has an oblong cross-section, as best seen in FIG. 2, and has an outer surface whose main portion includes two parallel planar surfaces, and two semi-circular surfaces. The nacelle has a longitudinal axis A at the line of intersection of the planes of symmetry B and C. At the forward end of the nacelle 1, two diametrically spaced front shoulders 1a are provided which extend transversely to the axis A to a pair of inlet ports 3. The conical surface of revolution of the cone 2 has a circular base line, two diametrical portions 2a of which are located inwardly of shoulders 1a. A pair of air passages 6 in the nacelle terminate in the inlet ports 3 and lead to power units 7. The other two circumferentially spaced surface portions of cone 2 merge along imaginary portions 2b of the circular base line into the main surface of the nacelle so that the lateral surfaces of the nacelle are continuous in the regions 1b from the pointed end of the cone 2 to the rear end of the nacelle. A first oblique compression shock wave 4 is produced by the pointed end of cone diffuser 2, and a second perpendicular shock wave is produced by the transverse shoulders 1a. The relative speed between the nacelle 1 and the air is reduced by the shock waves 2 so that a sonic speed of the streams of air entering through inlet ports 3 and passing to the power units 7 is obtained. The streams of air are completely separated from each other in passages 6. The supersonic diffuser, shown to be a cone 2 in FIGS. 1 to 3, may be modified as shown in FIGS. 4 and 5. In FIG. 4, the diffuser 2' includes a frusto-conical portion, and a forward conical portion terminating in a pointed end. An isentropic diffuser is shown in FIG. 5, which also shows an opening 11' produced by the shifting of the front of the inlet against the back part. Hydraulical means for shifting this part are numbered 12.

In all embodiments of the invention, it is possible to remove the boundary layer in a very simple manner. As shown in FIGS. 1 and 3, channels 8 have an inner inlet opening 10 opening on an inner surface of the passages 6, and outlet openings 9 on the outer surface of the nacelle 1 and located in a region where the pressure is lower than the pressure at the inlet opening 10.

Additional inlet passages 11 between the outer surface of the nacelle 1 and the passages 6 are advantageously provided so that additional air may be supplied to the power units 7. The air inlets 11 are preferably located in the region of the forward ends of the power units 7.

The cross-section of air inlets 11 are adjusted by closure means 11a which are operated by linkages, not shown so that the amount of additional air supplied to the power units 7 can be adjusted. It is also contemplated to supply heated air from the interior of the nacelle 1 to the surface of the central body by openings shown in FIG. 4 to prevent icing at very low outer temperatures.

The diffuser cone 2 and the edges of the openings 3 may be made of any suitable material including a synthetic material reinforced by textiles. The edges of inlet openings 3 are preferably sharp, but may be rounded off if required by operational conditions.

It is also possible to make cone 2 hollow, and to mount accessories of the power plant within cone 2.

The disclosed embodiments of the invention obtain a very high pressure yield through a great range of Mach numbers which favorably compares with the conditions prevailing at nacelles having a wedge inlet, without requiring an adjustment of the wedge angle. The air streams are completely separated so that the power units do not influence each other. The operation is not influenced by variations of the angle of attack, and in all power units, the supplied air is in substantially the same condition.

A substantial advantage of the construction of the present invention resides in that the gradient of the outer surface of the nacelle is smaller as compared with a wedge construction with separated air guiding means, since the cone angle is always greater than the corresponding wedge angle.

It will be understood that each of the elements described above, or two or more together, may also find a useful application in other types of housings for the power plant of a supersonic aircraft differing from the types described above.

While the invention has been illustrated and described as embodied in a nacelle having a central pointed supersonic diffuser, and air passages for the power units at diametrical points of the diffuser base, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a supersonic aircraft, in combination, a housing having an outer surface terminating at the forward end of said housing in a forwardly tapering substantially pointed surface of revolution, said housing having air passages terminating at said forward end of said housing in at least two spaced inlet ports located adjacent said surface of revolution circumferentially spaced about the same, said surface of revolution gradually merging between said inlet ports into the contour of the remainder of said outer surface; and a power unit located in each air passage so that separate streams of air reduced to sonic velocity by a shock wave forming at the forward end of said outer surface enter through said inlet ports for passing to power units located in said passages.

2. In a supersonic aircraft, in combination, a housing having an outer surface terminating at the forward end of said housing in a forwardly tapering substantially pointed conical surface of revolution, said housing having air passages terminating at said forward end of said housing in at least two spaced inlet ports located adjacent said surface of revolution circumferentially spaced about the same, said surface of revolution gradually merging between said inlet ports into the contour of the remainder of said outer surface; and a power unit located in each air passage so that separate streams of air reduced to sonic velocity by a shock wave forming at the forward end of said outer surface enter through said inlet ports for passing to power units located in said passages.

3. In a supersonic aircraft, in combination, a housing having an outer surface terminating at the forward end of said housing in a forwardlyl tapering surface of revolution including a frusto-conical surface portion and a substantially pointed conical surface portion forwardly of said frusto-conical surface portion, said housing having air passages terminating at said forward end of said housing in at least two spaced inlet ports located adjacent said surface of revolution circumferentially spaced about the same, said surface of revolution gradually merging between said inlet ports into the contour of the remainder of said outer surface; and a power unit located in each air passage so that separate streams of air reduced to sonic velocity by a shock wave forming at the forward end of said outer surface enter through said inlet ports for passing to power units located in said passages.

4. In a supersonic aircraft, in combination, a housing having an outer surface terminating at the forward end of said housing in a forwardly tapering substantially pointed isentropic surface of revolution, said housing having air passages terminating at said forward end of said housing in at least two spaced inlet portions located adjacent said surface of revolution circumferentially spaced about the same, said surface of revolution gradually merging between said inlet ports into the contour of the remainder of said outer surface; and a power unit located in each air passage so that separate streams of air reduced to sonic velocity by a shock wave forming at the forward end of said outer surface enter through said inlet ports for passing to power units located in said passages.

5. A nacelle for a supersonic aircraft and having an oblong cross-section and an outer surface including a forwardly tapering surface of revolution located at the forward end of the nacelle and having a pointed forward end and a circular base line, a main surface gradually merging along said base line into two diametrically disposed circumferentially spaced portions of said surface of revolution, and two diametrically disposed front shoulder surfaces extending transversely to the axis of said surface of revolution axially spaced from said pointed end and from said base line and located intermediate said two diametrically disposed circumferentially spaced portions of said surface of revolution, said nacelle having two inner air passages adapted to house separate power units and terminating in two inlet ports located between said shoulders and said surface of revolution so that portions of said surface of revolution extend into said passages whereby separate streams of air reduced to sonic velocity by shock waves forming at said pointed end and at said shoulders enter through said inlet ports for passing to power units located in said passages.

6. A nacelle for a supersonic aircraft and having an oblong cross-section and an outer surface including a forwardly tapering surface of revolution located at the forward end of the nacelle and having a pointed forward end and a circular base line, a main surface gradually merging along said base line into two diametrically disposed circumferentially spaced portions of said surface of revolution, and two diametrically disposed front shoulder surfaces extending transversely to the axis of said surface of revolution axially spaced from said pointed end and from said base line and located intermediate said two diametrically disposed circumferentially spaced portions of said surface of revolution, said nacelle having two inner air passages adapted to house separate power units and terminating in two inlet ports located between said shoulders and said surface of revolution, said inlet ports curving about said surface of revolution and having opposite parallel curved edges so that portions of said surface of revolution extend into said passages whereby separate streams of air reduced to sonic velocity by shock waves forming at said pointed end and at said shoulders enter through said inlet ports for passing to power units located in said passages.

7. A nacelle as set forth in claim 6 and being formed with channels having forward ends opening into said passages and rearward ends opening on said main surface for removing the boundary layer of air in said passages.

8. A nacelle as set forth in claim 7 wherein said channels have an annular inlet opening communicating with the forward ends of said passages.

9. A nacelle as set forth in claim 6 and including inlet ducts extending from said main surface into said air passages and being rearwardly spaced from said inlet ports so as to be located in the region of the power units for supplying air to the same.

10. A nacelle as set forth in claim 9 and including closure means for gradually closing said ducts.

11. A nacelle for a supersonic aircraft and having an outer surface including a forwardly tapering surface of revolution located at the forward end of the nacelle and having a pointed forward end and a circular base line, a main surface gradually merging along said base line into circumferentially spaced portions of said surface of revolution, and front surfaces extending transversely to the axis of said surface of revolution axially spaced from said pointed end and from said base line and located intermediate said circumferentially spaced portions of said surface of revolution, said nacelle having inner air passages adapted to house separate power units and terminating in inlet ports located between said front surfaces and said surface of revolution so that portions of said surface of revolution extend into said passages whereby separate streams of air reduced to sonic velocity by shock waves forming at said pointed end and at said front surfaces enter through said inlet ports for passing to power units located in said passages.

References Cited by the Examiner

UNITED STATES PATENTS

| | | | |
|---|---|---|---|
| 2,634,049 | 4/53 | Hodges et al. | 244—134 X |
| 2,721,715 | 10/55 | Hoadley | 60—35.6 |
| 2,840,325 | 6/58 | Griffith | 60—35.6 X |
| 2,939,276 | 6/60 | Wise | 60—35.6 |
| 2,973,921 | 3/61 | Price. | |
| 3,013,385 | 12/61 | Kerry et al. | |
| 3,030,770 | 4/62 | Ranard et al. | 60—35.6 |
| 3,041,824 | 7/62 | Berhman | 60—35.5 |
| 3,045,953 | 7/62 | Eggers et al. | |
| 3,066,892 | 12/62 | Smith et al. | 60—35.6 X |
| 3,138,920 | 6/64 | Reichert | 60—35.6 |

FOREIGN PATENTS

| | | |
|---|---|---|
| 1,150,625 | 8/57 | France. |
| 587,126 | 4/47 | Great Britain. |

OTHER REFERENCES

German application 1,078,375 Mar. 24, 1960.

SAMUEL LEVINE, *Primary Examiner.*